United States Patent
Kashima (10) Patent No.: US 8,611,745 B2
(45) Date of Patent: Dec. 17, 2013

(54) PASSIVE OPTICAL NETWORK COMMUNICATION SYSTEM

(75) Inventor: Masayuki Kashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 958 days.

(21) Appl. No.: 12/318,113

(22) Filed: Dec. 22, 2008

(65) Prior Publication Data

US 2009/0202246 A1   Aug. 13, 2009

(30) Foreign Application Priority Data

Feb. 13, 2008   (JP) ................. 2008-031773

(51) Int. Cl.
   *H04J 14/00*   (2006.01)
(52) U.S. Cl.
   USPC ................. 398/77; 398/67; 398/72
(58) Field of Classification Search
   USPC ............................. 398/77, 78
   See application file for complete search history.

(56) References Cited

U.S. PATENT DOCUMENTS

| 7,860,395 | B2 | 12/2010 | Kashima et al. | |
|---|---|---|---|---|
| 2004/0218924 | A1* | 11/2004 | Fathallah | 398/77 |
| 2006/0115272 | A1* | 6/2006 | Minato et al. | 398/77 |
| 2008/0013728 | A1* | 1/2008 | Niu et al. | 380/256 |
| 2009/0269064 | A1* | 10/2009 | Joseph et al. | 398/78 |

FOREIGN PATENT DOCUMENTS

| EP | 1458214 | 9/2004 |
|---|---|---|
| JP | 2003-317026 | 11/2003 |
| JP | 2004-080385 | 3/2004 |
| JP | 3913139 | 2/2007 |
| JP | 2007-208746 A | 8/2007 |
| JP | 2009-055307 | 3/2009 |

OTHER PUBLICATIONS

Choi, K. M.; Lee, S. M.; Kim, M. H.; Lee, C. H.; "An Efficient Evolution Method From TDM-PON to Next-Generation PON," Photonics Technology Letters, IEEE, vol. 19, No. 9, pp. 647-649, May 1, 2007; doi: 10.1109/LPT.2007.894958.*

SG-15: "Gigabit-capable Passive Optical Networks (G-PON): Enhancement Band, G.984.5, (Sep. 2007)", ITU-T Recommendation, Sep. 2007, XP002526673 International Telecommunication Union.

Gupta, G. C., et al., "A Simple One-System Solution COF-PON for Metro/Access Networks", Journal of Lightwave Technology, IEEE Service Center, New York, NY, US, vol. 25, No. 1, Jan. 1, 2007, pp. 193-200, XP011175461, ISSN: 0733-8724.

McGregor et al., "Implementation of a TDM Passive Optical Network for Subscriber Loop Applications", J. Lightwave Technology, vol. 7, No. 11, pp. 1752-1758 Nov. 1989.

(Continued)

*Primary Examiner* — Nathan Curs
(74) *Attorney, Agent, or Firm* — Rabin & Berdo, P.C.

(57) ABSTRACT

A passive optical network communication system includes a number of subscribers' units connected to a central line termination unit through a passive optical coupler. The line termination unit includes a first section that transmits and receives a code division multiplex (CDM) signal, a second section that transmits and receives a time division multiplex (TDM) signal, and a wavelength multiplexing filter that combines the transmitted CDM and TDM signals into a single downstream optical signal, and separates the CDM and TDM components of an upstream signal received from the subscribers' units through the passive optical coupler. The CDM signal provides channels for digital video transmission to CDM-capable subscribers' units.

19 Claims, 8 Drawing Sheets

(56) References Cited

OTHER PUBLICATIONS

Tamai et al., Research and development of COF-PON: a next-generation optical access system, Oki Technical Review, Issue 210, vol. 74, No. 2, Apr. 2007.

Kashima et al., Research and development of high QoS multimedia optical distribution system—COF transceiver, Oki Technical Review, Issue 200, vol. 71, No. 4, Oct. 2004.

Sasase, "Optical Code Division Multiple Access Techniques in Optical Communication Systems", Telecomfrontier, Nov. 2004.

Kent McCammon et al., "Experimental Validation of an Access Evolution Strategy: Smooth FTTP Service Migration Path" OFC/NFOEC 2007, Mar. 2007.

Kerim Fouli et al., "OCDMA and Optical Coding: Principles, Applications, and Challenges", IEEE Comminications Magazine, Aug. 2007, vol. 45, No. 8, pp. 27-34.

* cited by examiner

PASSIVE OPTICAL NETWORK COMMUNICATION SYSTEM

BACKGROUND OF THE INVENTION

1. Field of the Invention

The present invention relates to a passive optical network for communication between an optical line terminal and a plurality of subscriber' optical network units by use of code division multiplexing (CDM) and time division multiplexing (TDM).

2. Description of the Related Art

Passive optical network (PON) systems that provide bidirectional communication between a central node and a plurality of subscribers' units are often considered for use as optical access network systems. The main advantage of a PON system is that by sharing an optical transmission path among a plurality of subscribers, it can reduce system equipment costs.

Typical of the PON systems now in use are gigabit-PON (G-PON) systems, which operate at wavelengths from 1250 to 1500 nanometers. Different wavelengths are allocated to the upstream traffic from the subscribers' units to the central node and the downstream traffic from the central node to the subscribers' units, as described by McGregor et al. in 'Implementation of a TDM Passive Optical Network for Subscriber Loop Applications', *J. Lightwave Technology*, Vol. 7, No. 11, pp. 1752-1758 November 1989.

PON systems that employ CDM are also attracting attention. Examples of such CDM-PON systems are described by Tamai et al. in 'Jisedai hikari akusesu shisutemu COF-PON no kenkyu kaihatsu' (Research and development of COF-PON: a next-generation optical access system), *Oki Technical Review*, Issue 210, Vol. 74, No. 2, April 2007, by Kashima et al. in 'Ko-QoS maruchi media hikari haishin shisutemu no kenkyu kaihatsu—COF transhiba' (Research and development of high-QoS multimedia optical distribution system— COF transceiver) *Oki Technical Review*, Issue 200, Vol. 71, No. 4, October 2004, by Sasase in 'Hikari shisutemu ni okeru hikari fugo bunkatsu tagen setsuzoku gijutsu' (Optical Code Division Multiple Access Techniques in Optical Communication Systems) *TELECOMFRONTIER*, November 2004, and by Matsumoto in Japanese Patent Application Publication No. 2003-317026.

These CDM-PON systems enable simultaneous multiplexing of a plurality of signals, and offer a large communication capacity while conserving communication resources such as wavelengths and time slots. A CDM-PON system of the synchronous CDM type disclosed by Kashima in Japanese Patent No. 3913139, for example, which carries out synchronization on each channel, has the further advantage of being able to extract signals on an arbitrary channel from the CDM signal.

CDM-PON optical access enables longer-reach transmission than TDM optical access. In CDM-PON optical access the same wavelength can be used to carry signals in both directions, so CDM-PON systems can easily be combined with wavelength division multiplexing (WDM) optical access.

A future requirement for optical access services will be to combine data communication with video communication. Present WDM-PON systems use cable television transmission technology to transmit and receive analog video signals in optical form. Future PON systems will need to find a way to combine digital video transmission with data communication.

One issue to be addressed is the much greater information content of a video signal, as compared with a data communication signal. Another issue is the real-time nature of video transmission. If video signals are transmitted in digital form, accordingly, a large guaranteed bandwidth, that is, a high assured bit rate, must be provided in real time.

In current WDM video communication systems in which an analog video data signal is transmitted and received in optical signal form as described above, if the signal is transmitted over a long distance, the receiving equipment must include an optical amplifier, but optical amplifier installation costs are high. In a long-reach PON system, in which each subscriber's receiving unit requires an optical amplifier, a large number of optical amplifiers are necessary, significantly increasing the system cost.

When TDM access and analog optical signal transmission and reception are implemented in a G-PON system, the sensitivity of the photodetector and the signal-to-noise ratio of the optical signal must be sufficiently high. The receiving unit therefore requires a wavelength filter that can provide a strong degree of isolation of the received signal. Such filters are costly, which is another factor that increases the system cost.

Present G-PON systems do not provide enough bandwidth to accommodate additional digital video signals in the same time slots as used for telephony and other purposes. If digital video transmission is desired, it is necessary to add a parallel G-PON system with a different pair of wavelengths, one for upstream transmission and one for downstream transmission. Besides requiring additional wavelength resources, this requires additional wavelength filters, greatly increasing the system complexity and cost.

A series of studies by the present inventor led to recognition that a PON communication system configured by combining a CDM-PON communication system with a conventional G-PON communication system is capable of transmitting a large amount of digital data, including digital video signals, without changing the configuration of the conventional G-PON system and without greatly increasing the use of wavelength resources.

SUMMARY OF THE INVENTION

An object of the present invention is to provide a PON communication system that enables simultaneous transmission of digital data signals and digital video signals at low cost without requiring excessive modification of a conventional G-PON optical access network communication system.

Another object is to conserve wavelength resources, thereby leaving sufficient wavelength for high-capacity digital transmission.

The invention provides a passive optical network communication system in which a plurality of subscribers' units access a central line termination unit through a passive optical coupler.

The line termination unit includes a first section or CDM section that outputs a downstream CDM signal including a plurality of downstream code channels, transmits the downstream CDM signal to the subscribers' units, and receives an upstream CDM signal including a plurality of upstream code channels from the subscribers' units. The upstream and downstream CDM signals occupy a first wavelength band.

The line termination unit also includes a second section or TDM section that generates a downstream TDM signal including a plurality of downstream time slots, transmits the downstream TDM signal to the subscriber units in a second wavelength band separate from the first wavelength band, and receives an upstream TDM signal including a plurality of upstream time slots from the subscriber units in a third wavelength band separate from both the first and second wavelength bands. The TDM section includes a wavelength separation filter that separates the second wavelength band from the third wavelength band.

A wavelength multiplexing filter in the line termination unit combines the downstream CDM signal with the downstream TDM signal for transmission to the subscribers' units, and separates the upstream CDM signal from the upstream and downstream TDM signals by separating the first wavelength band from the second and third wavelength bands.

The CDM signals and in particular the downstream CDM signal can be used to transmit digital video. Sufficient bandwidth is available for this purpose because the CDM signals do not compete with the TDM signals for time slots.

A video capability can be added to an existing TDM-PON system just by adding a wavelength multiplexing filter and a CDM section to the line termination unit. No wavelength changes or other modifications of the existing TDM section are necessary. Existing subscribers' units in the system can continue to operate as in a conventional TDM-PON, without requiring an additional filter to block the CDM signals, because the wavelength filters that these subscribers' units already use to separate the upstream from the downstream TDM wavelength already block the CDM wavelength band.

Although CDM-capable subscribers' units require a wavelength filter to block the TDM signal, because of the coding gain associated with CDM transmission, an inexpensive filter without high wavelength isolation performance can be used. System cost remains low.

Wavelength resources are conserved because the same wavelength can be used for both upstream and downstream CDM signals. Only one new wavelength band needs to be reserved.

The added CDM transmission section can be used to transmit multiple video signals to the subscribers' units on multiple code channels, so that a CDM-capable subscriber's unit can receive multiple video channels simultaneously.

Alternatively, a separate bidirectional CDM channel, usable for telephony, Internet access, or any other purpose, can be provided for each CDM-capable subscriber's unit. In addition, one or more common code channels can be provided in the downstream CDM signal for video transmission to all the CDM-capable subscribers' units.

In yet another scheme, the CbM signals are divided into time slots, and multiple code channels are provided in each time slot. In this scheme each CDM-capable subscriber's unit may be assigned one CDM time slot, and may use the multiple code channels as bidirectional communication channels. Alternatively, two or more subscribers' units may share the same CDM time slot, to increase the number of subscribers' units that can be served.

DETAILED DESCRIPTION OF THE INVENTION

Embodiments of the invention will now be described with reference to the attached non-limiting drawings, in which like elements are indicated by like reference characters. For simplicity, all signals will be described as optical signals.

First a general description of the network architecture common to all of the embodiments will be described.

Figure 1:
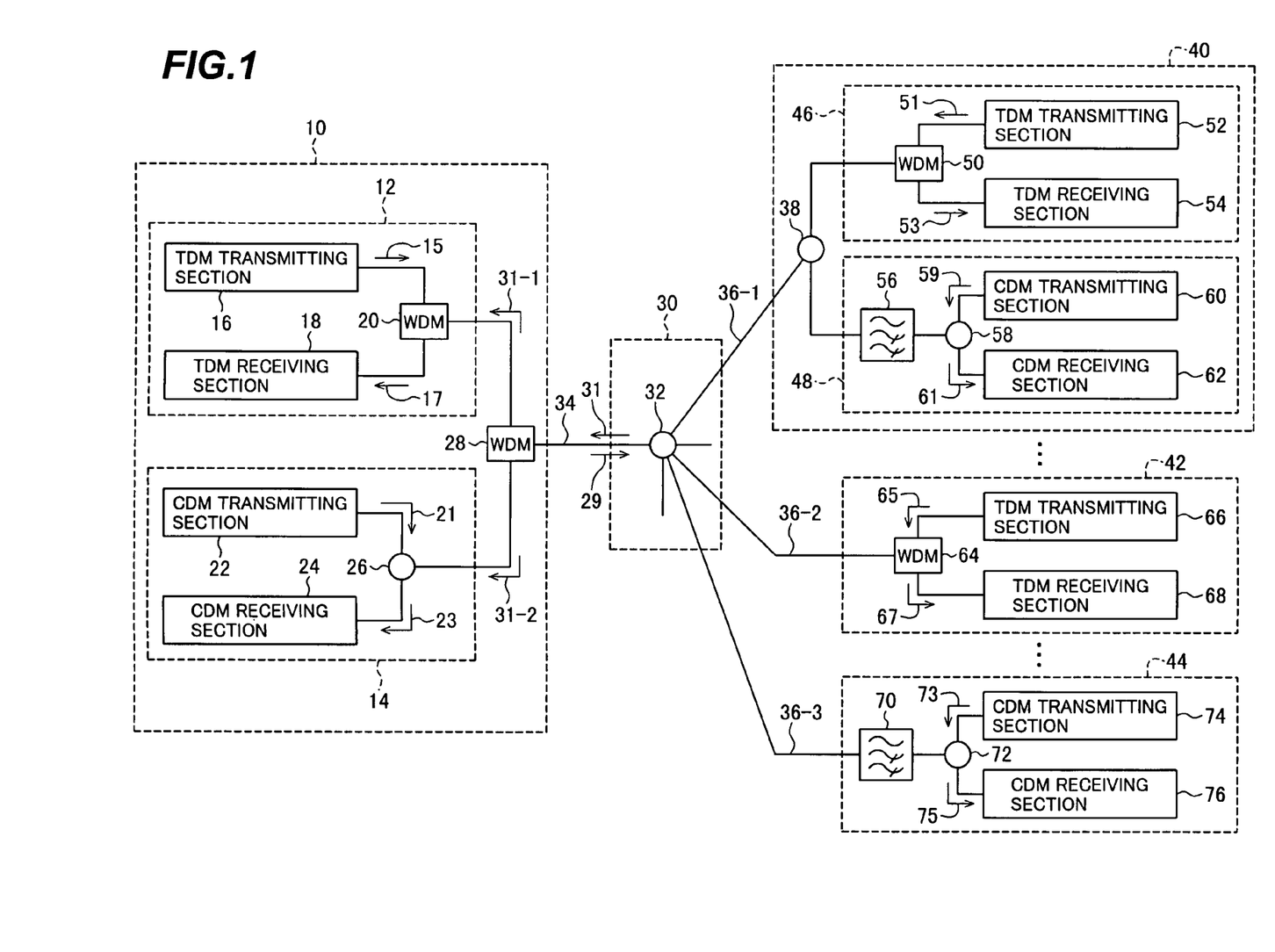
FIG. 1 is a block diagram showing the configuration of a PON communication system embodying the present invention.

Referring to FIG. 1, in all of the embodiments below, a plurality of subscriber's optical network units (ONUs) are linked to a central optical line termination unit (OLT) 10 through a passive optical network (PON) 30. The PON 30 includes a passive optical coupler 32 connected to the OLT 10 through a single optical fiber 34 at one end and connected to the plurality of ONUs through a like plurality of branch optical fibers at the other end. This drawing shows only three exemplary branch optical fibers 36-1, 36-2, and 36-3, which are connected to ONUs 40, 42, and 44, respectively.

The OLT is typically installed in a central location such as a telephone switching office or an office of some other type of network service provider. The OLT is often referred to as a center node or service node. The ONUs are sometimes referred to as edge nodes.

Although FIG. 1 shows a PON system including a single passive optical coupler 32, a configuration having a cascaded plurality of passive optical couplers 32 is possible, and is rather common in practice. A single optical fiber connects the OLT 10 to a first passive optical coupler 32; the first passive optical coupler 32 is connected through branch fibers to a plurality of further passive optical couplers. These passive optical couplers may be connected through further branch fibers to the ONUs, or to further passive optical couplers, which may be connected to still further passive optical couplers and so on.

A cascaded PON may thus include any number of passive optical couplers. The passive optical coupler 32 shown in FIG. 1 may represent either a single passive optical coupler or a cascaded plurality of passive optical couplers.

The present invention permits the assignment of arbitrary wavelengths within bands a few tens of nanometers (nm) in width to the CDM and TDM signals. In the embodiments below, the band from 1520 nm to 1540 nm, or alternatively, a band above 1570 nm, is reserved for CDM signals; the band from 1250 nm to 1350 nm is reserved for upstream TDM signals; and the band from 1480 nm to 1500 nm is reserved for downstream TDM signals. The TDM wavelength bands are identical to the wavelength bands used in conventional G-PON systems.

Any wavelengths within the ranges stated above may be assigned to the CDM signals and the upstream and downstream TDM signals, as called for by system design considerations. For example, CDM signals may be assigned to the 1530-nm wavelength, upstream TDM signals to the 1300-nm wavelength, and downstream TDM signals to the 1490-nm wavelength, as will be assumed below.

Among the plurality of ONUs 40, 42, 44 in FIG. 1, ONU 44 is configured for CDM-PON operation, and will be referred below to as an ONU of the first type; ONU 42 is configured for conventional G-PON operation, and will be referred to as an ONU of the second type; ONU 40 is configured for both conventional G-PON operation and CDM-PON operation, and will be referred to as an ONU of the third type.

The invention is not limited to the G-PON version of TDM-PON operation, or to any particular combination of ONUs of the first, second, and third types, provided at least one ONU is capable of TDM operation and at least one ONU is capable of CDM operation.

The OLT 10 includes a TDM section 12, a CDM section 14, and a wavelength multiplexing filter or WDM filter 28.

The WDM filter 28 receives an upstream signal 31 in which a 1300-nm upstream TDM signal is multiplexed with a 1530-nm upstream CDM signal, separates these signals on the basis of their wavelengths, and routes the upstream TDM signal to the TDM section 12 and the upstream CDM signal to the CDM section 14. In the downstream direction, the WDM filter 28 combines a 1490-nm TDM signal 15 received from the TDM section 12 with a 1530-nm CMD signal 21 received from the CDM section 14 into a single multiplexed downstream signal 29, which it transmits to the ONUs.

The CDM section 14 includes a CDM transmitting section 22, a CDM receiving section 24, and an optical splitter/combiner 26. The CDM transmitting section 22 generates a CDM signal 21 that is routed through the optical splitter/combiner 26 to the WDM filter 28 and transmitted through the optical fibers and passive optical coupler 32 to all the ONUs.

Upstream signals transmitted from the ONUs are combined by the passive optical coupler 32 and arrive at the WDM filter 28 as an upstream optical signal 31. The WDM filter 28 separates the upstream optical signal 31 on the basis of wavelength into an upstream TDM signal 31-1, which is supplied to the TDM section 12, and an upstream CMD signal 31-2, which is supplied through the optical splitter/combiner 26 to the CDM receiving section 24 in the CDM section 14 as a CDM signal 23.

The TDM section 12 includes a TDM transmitting section 16, a TDM receiving section 18, and a wavelength separation filter 20, also referred to as a WDM filter. The TDM transmitting section 16 generates an optical TDM signal 15 that is transmitted through WDM filter 20 to WDM filter 28 and then through the optical fibers and passive optical coupler 32 to the ONUs. The optical TDM signal 31-1 received from WDM filter 28 is routed through WDM filter 20 to the TDM receiving section 18 as a TDM signal 17.

The upstream CDM signal 31-2 is a 1530-nm signal obtained by WDM filter 28 by filtering out the 1490-nm downstream TDM signal component and the 1300-nm upstream TDM component of the. Since WDM filter 28 blocks both TDM signal components and passes only the CDM signal components, there is no need to include a wavelength filter for blocking TDM signal components in the CDM section 14.

En route to the ONUs, the downstream signal 29 passes through the passive optical coupler 32, where it is split into a number of identical signals equal to the number of ONUs. Except for being reduced in power, these branch downstream signals are identical to the downstream signal 29 output from the OLT 10, so the branched downstream signals supplied to the ONUs will also be denoted by reference numeral 29.

Similarly, reference numeral 31 may be used to denote the individual upstream signals transmitted from the plurality of ONUs, as well as the combined upstream signal received by the OLT 10.

The structure and operation of the three types of ONUs used in FIG. 1 will now be described.

The first type of ONU, exemplified by ONU 44 in FIG. 1, has a wavelength filter 70, an optical splitter/combiner 72, a CDM transmitting section 74, and a CDM receiving section 76. The CDM transmitting section 74 generates and transmits a CDM signal 73. The CDM signal 73 is routed through optical splitter/combiner 72 and wavelength filter 70 to optical branch fiber 36-3 and transmitted to the OLT 10. The wavelength filter 70 separates the downstream signal 29 received from the OLT 10 on the basis of wavelength and inputs the CDM component of the signal through optical splitter/combiner 72 to the CDM receiving section 76 as a CDM signal 75. An ONU 44 of the first type is accordingly a subscriber unit of the general type used in a CDM-PON system.

In this example, the wavelength filter 70 separates the 1530-nm wavelength of the CDM component of the downstream signal 29 from the 1490-nm wavelength of the downstream TDM component, rejects the downstream TDM component, and passes the remaining CDM signal 75 to the CDM receiving section 76.

The wavelength filter 70 does not need to provide a high degree of wavelength isolation. In decoding the downstream CDM signal, the CDM receiving section 76 combines N chip pulses to obtain one decoded pulse, where N is the code length. The decoding process therefore has an intrinsic energy gain of N, where N is typically an integer greater than ten. This gain is referred to as the coding gain. The energy of the individual chip pulses is comparable to the energy of a pulse in the downstream TDM signal. The energy of a pulse in the decoded CDM signal is therefore many times greater than any noise energy that may be present due to crosstalk from the TDM signals. An adequate signal-to-noise ratio can be obtained even if the isolation performance of the wavelength filter 70 is relatively low.

Another effect of the coding gain is that CDM signals can be transmitted over longer distances than TDM signals.

The second type of ONU, which functions like an ONU in a conventional TDM-PON system, will now be described. This type of ONU, exemplified by ONU 42 in FIG. 1, is similar to a subscriber unit of the general type used in a TDM-PON system.

ONU 42 has a wavelength separation (WDM) filter 64, a TDM transmitting section 66, and a TDM receiving section 68. The TDM transmitting section 66 generates and transmits a TDM signal 65. The TDM signal 65 is transmitted through the WDM filter 64 to the OLT 10. The WDM filter 64 receives the downstream signal 29 transmitted from the OLT 10, separates the downstream TDM component of this signal from the upstream TDM signal 65 on the basis of their wavelengths, and inputs the downstream TDM component to the TDM receiving section 68 as a TDM signal 67.

In selecting the downstream TDM signal, the WDM filter 64 also rejects the CDM component of the downstream signal 29. An existing type of ONU 42 can therefore be used without adding an extra wavelength filter or other device to remove the CDM signal component.

Next, the structure and operation of the third type of ONU, exemplified by ONU 40 in FIG. 1, will be described. The third type of ONU combines the functions of the ONUs found in conventional G-PON and CDM-PON systems.

ONU 40 includes an optical splitter/combiner 38, a TDM section 46, and a CDM section 48.

The TDM section 46 includes a wavelength separation (WDM) filter 50, a TDM transmitting section 52, and a TDM receiving section 54. The TDM transmitting section 52 generates and transmits a TDM signal 51. The TDM signal 51 is routed through WDM filter 50 and transmitted to the OLT 10. WDM filter 50 receives the downstream signal 29 transmitted from the OLT 10, separates the downstream TDM component on the basis of its wavelength, and inputs the downstream TDM component as a TDM signal 53 to the TDM receiving section 54. WDM filter 50 also rejects the CDM component of the downstream signal 29, so no extra wavelength filter or other device is needed in the TDM section 46 to remove the CDM signal component.

The CDM section 48 has a wavelength filter 56, an optical splitter/combiner 58, a CDM transmitting section 60, and a CDM receiving section 62. The CDM transmitting section 60 generates and transmits a CDM signal 59. The CDM signal 59 is routed through optical splitter/combiner 58 to the wavelength filter 56 and transmitted to the OLT 10. Wavelength separation filter 56 separates the CDM component of the downstream signal 29 received from the OLT 10 on the basis of its wavelength and inputs the CDM component through optical splitter/combiner 58 to the CDM receiving section 62 as a CDM signal 61. As described above, a wavelength filter 56 with low isolation performance may be used in the CDM section 48.

Three embodiments of the invention will now be described. The first embodiment includes an ONU of the third type, and may also include ONUs of the first and second types. The second embodiment includes ONUs of the first and second types, and may also include ONUs of the third type. The third embodiment includes ONUs of the first type and at least one ONU of the second or third type.

ONUs of the first type will be described in detail in the second and third embodiments. An ONU of the third type will be described in the first embodiment. ONUs of the second type will not be described in detail, because they are identical to the known ONUs used in conventional G-PON systems.

First Embodiment

The first embodiment includes an OLT 10 and at least one ONU 40 of the third type.

Figure 2:
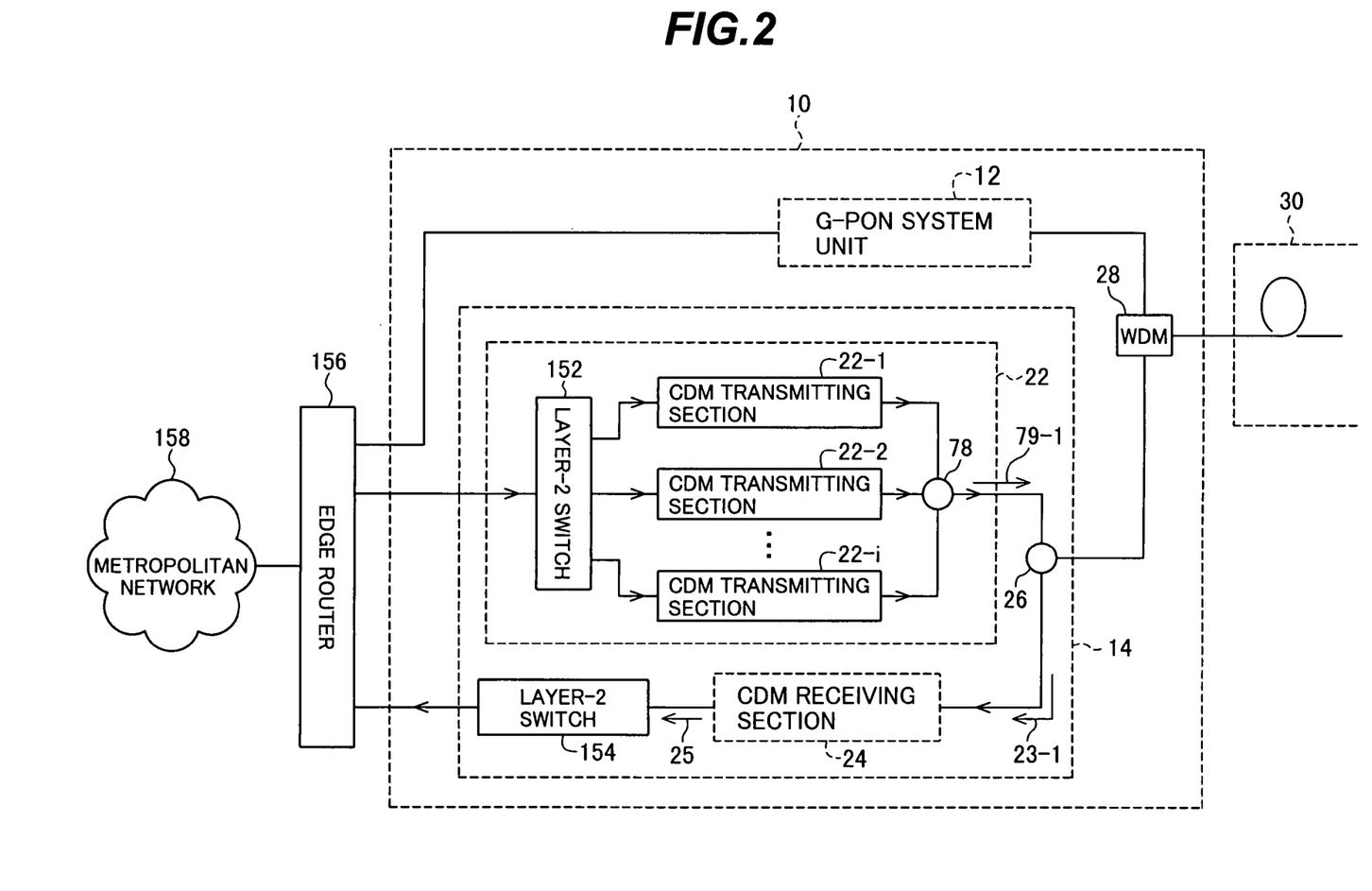
FIG. 2 is a block diagram showing the configuration of the line termination unit in the PON communication system in a first embodiment.

Referring to FIG. 2, the OLT 10 includes a TDM section 12, a CDM section 14, and an WDM filter 28 as explained above, and is characterized by the internal structure of the CDM section 14. The TDM section 12 and WDM filter 28 may have known internal structures, which are not shown. The TDM section 12 functions as in a conventional G-PON communication system, and is therefore labeled as a G-PON system unit in FIG. 2 and subsequent drawings.

As explained above, the CDM section 14 includes a CDM transmitting section 22, a CDM receiving section 24, and an optical splitter/combiner 26.

The CDM transmitting section 22 includes a layer-two switch 152, a plurality of CDM transmitters 22-1, 22-2, . . . , 22-i connected in parallel, and an optical combiner 78. CDM signals output from the individual CDM transmitters are combined in the optical combiner 78 and output as a downstream CDM signal 79-1. The downstream CDM signal 79-1 is routed through optical splitter/combiner 26 to WDM filter 28, and transmitted through the passive optical network 30 to the ONUs.

The downstream CDM signal 79-1 in this embodiment includes i code channels, each carrying a different digital video signal. The CDM transmitters 22-1, 22-2, . . . , 22-i include encoders (not shown), each operating with a different code. Each of the CDM transmitters 22-1, 22-2, . . . , 22-i encodes and transmits one of the digital video signals.

The digital video signals may be supplied from a metropolitan network 158, for example, via an edge router 156 including a layer-one switch (not shown) that separates video traffic, which is routed through the CDM section 14, from other signal traffic, which is routed through the TDM section 12. The layer-two switch 152 distributes the individual video signals, representing different television channels, for example, to the CDM transmitters 22-1, 22-2, . . . , 22-i.

The first embodiment has the advantage of being able to accommodate an arbitrary number of video channels simply by adding a WDM filter 28 and the necessary number (i) of CDM transmitters to a conventional TDM section 12.

The upstream CDM signal is input through the WDM filter 28 and optical splitter/combiner 26 to the CDM receiving section 24 as a CDM signal 23-1. The CDM signal 23-1 is decoded in the CDM receiving section 24 and output as a received signal 25. The received signal 25 is then transmitted through another layer-two switch 154 and the edge router 156 to the metropolitan network 158.

The CDM receiving section 24 includes, for example a number of decoders (not shown) equal to the number of ONUs of the third type served by the OLT 10. This arrangement enables each ONU of the third type to use one CDM code channel for upstream transmission. If necessary, additional code channels may be provided for ONUs of the first type, or ONUs of the third type that require more than one upstream code channel. Alternatively, if some of the ONUs of the third type do not need to transmit CDM signals upstream, the number of decoders in the CDM receiving section 24 may be reduced.

Figure 3:
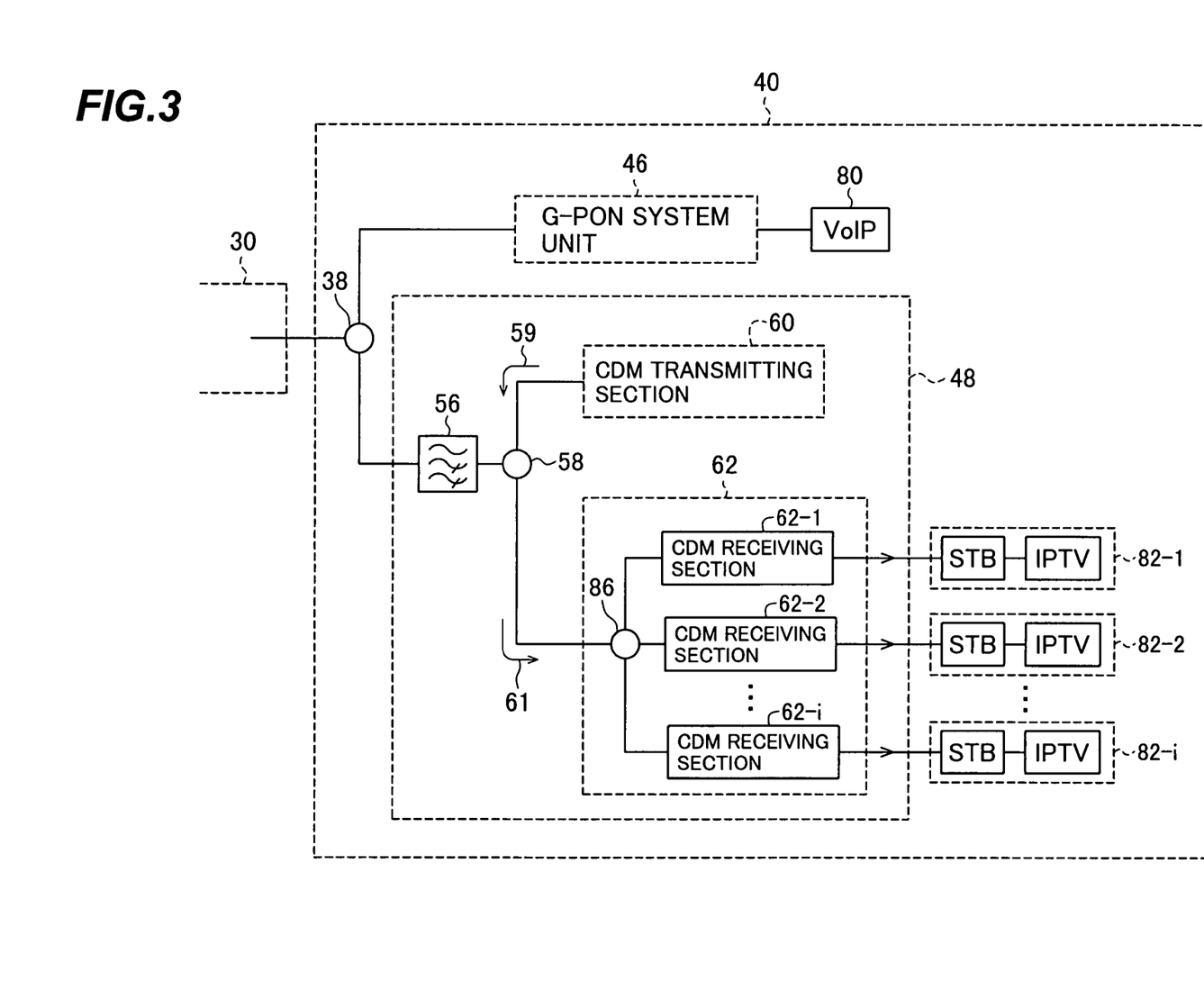
FIG. 3 is a block diagram showing the configuration of a third type of subscriber's unit of the PON communication system in the first embodiment.

Next, the structure and operation of ONU 40 will be described with reference to FIG. 3.

Being of the third type, ONU 40 has a TDM section 46 and a CDM section 48. The TDM section 46 functions as in a conventional G-PON communication system, as indicated by the legend in the drawing, and has the internal structure shown in FIG. 1. The exemplary TDM section 46 in FIG. 3 is used for voice transmission by the well-known voice over Internet protocol (VoIP). The TDM section 46 is therefore connected to a VoIP input-output unit 80 that converts a voice signal to packets of compressed digital data and transmits the packets in real time, and converts incoming packets of compressed data to a voice signal that is reproduced in real time.

The CDM section 48 has a wavelength filter 56, an optical splitter/combiner 58, a CDM transmitting section 60, and a CDM receiving section 62.

The CDM transmitting section 60 generates and transmits a CDM signal 59. The CDM signal 59 is routed through optical splitter/combiner 58 to the wavelength filter 56, and transmitted through optical splitter/combiner 38 and the passive optical network 30 to the OLT 10. This upstream CDM signal 59 may include any number of code channels, which may be used for any purposes.

The CDM receiving section 62 includes a plurality of CDM receivers 62-1, 62-2, . . . , 62-i connected in parallel (i is an integer greater than two). The downstream CDM signal 61 is split into i mutually identical CDM signals and the i branched signals are supplied to the individual CDM receivers 62-1, 62-2, . . . , 62-i.

This structure enables reception of digital video signals transmitted from the OLT 10 to the ONUs over i channels assigned to the individual receivers. The CDM receivers 62-1, 62-2, . . . , 62-i individually include decoders that operate with the same codes as used by the encoders included in the CDM transmitters 22-1, 22-2, . . . , 22-i in the OLT.

The CDM receivers 62-1, 62-2, . . . , 62-i output decoded signals to respective digital video display units 82-1,

82-2, ..., 82-i, on which received video pictures are displayed. Each of the digital video display units 82-1, 82-2, ..., 82-i includes, for example, a set-top box (STB) connected to an Internet protocol (IP) television system (IPTV). The set-top provides further decoding and/or reformatting of the received signal to obtain a digital video signal that can be displayed by the IPTV. The IPTV includes signal processing circuitry and a display screen. The IPTV may be built into a television set or personal computer, for example.

As described above, the first embodiment provides a simple way for a passive optical network operator to add video service to telephony, Internet access, and other services carried by conventional G-PON systems. The first embodiment is particularly suited for multicast or broadcast transmission of digital video signals to multiple ONUs, each of which may receive the video signals on any or all of the channels. A typical ONU of this type would be a house with television sets in different rooms. The CDM section of the ONU may also, however, be configured to support services such as videophone communication and broadband Internet access.

Second Embodiment

The second embodiment includes an OLT 10, multiple ONUs of the first type, and at least one ONU of the second type.

Figure 4:
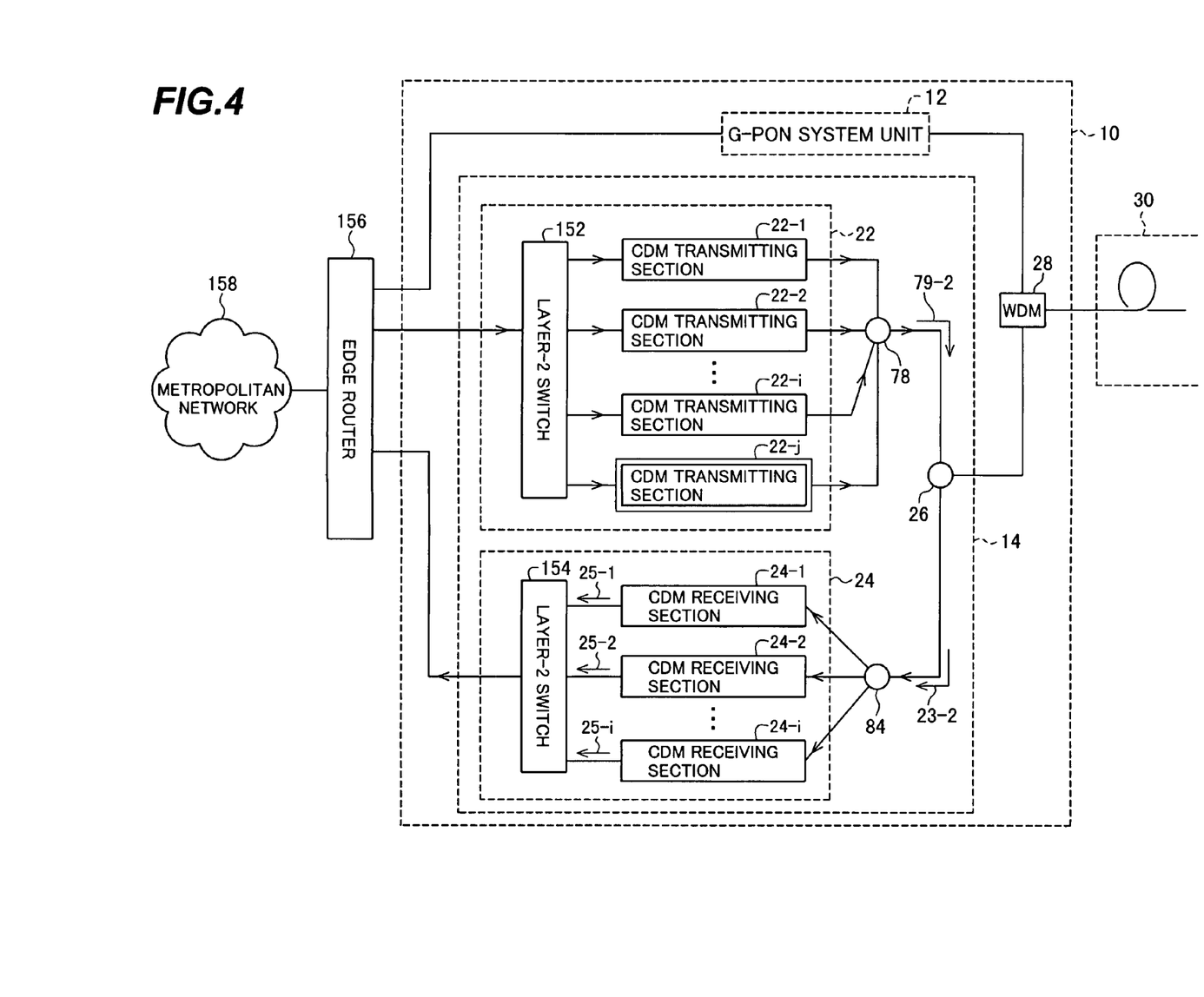
FIG. 4 is a block diagram showing the configuration of the line termination unit in the PON communication system in a second embodiment.

Referring to FIG. 4 the OLT 10 in the second embodiment includes a TDM section (G-PON communication system) 12, a CDM section 14, and a WDM filter 28 as explained above. The second embodiment differs from the PON communication system in the structure of the CDM section 14, which will be described below.

Whereas the first embodiment provides for multicast or broadcast transmission of digital video signals on a plurality of channels to one or more ONUs, each of which can receive all channels, the second embodiment provides one bidirectional communication channel for each of a plurality of ONUs, and one common video channel for multicast or broadcast transmission to all of these ONUs.

In other regards, the second embodiment is similar to the first embodiment. A description of the TDM section 12 will be omitted.

The CDM section 14 includes a CDM transmitting section 22, a CDM receiving section 24, an optical splitter/combiner 26, an optical combiner 78, and an optical splitter 84.

The CDM transmitting section 22 includes a plurality of CDM transmitters 22-1, 22-2, ..., 22-i connected in parallel (where i is an arbitrary integer greater than one), for transmission of differently coded signals to i ONUs of the first type. The CDM transmitting section 22 also includes a CDM transmitter 22-j for multicast or broadcast transmission of a digital video signal to all i of these ONUs. The coded signals output from the CDM transmitters 22-1, 22-2, ..., 22-i, and 22-j are combined in optical combiner 78 and the combined signal is output as a CDM signal 79-2 to optical splitter/combiner 26. The CDM signal 79-2 is routed through optical splitter/combiner 26 to the WDM filter 28 and transmitted through the passive optical network 30 to the ONUs.

The CDM transmitting section 22 also includes a layer-two switch 152 connected to the CDM transmitters 22-1, 22-2, ..., 22-j. The layer-two switch 152 may be connected through an edge router 156 to a metropolitan network 158. In this case, downstream digital signals are transmitted from the metropolitan network 158 through the edge router 156 to the layer-two switch 152, and supplied to the CDM transmitters 22-1, 22-2, ..., 22-i and 22-j for output to the ONUs.

The CDM receiving section 24 includes i CDM receivers 24-1, 24-2, ..., 24-i, corresponding to the i CDM transmitters 22-1, 22-2, ..., 22-i, thereby providing i bidirectional communication channels between the OLT 10 the ONUs of the first type. The upstream channels are distinguished by the different codes assigned to the CDM receivers 24-1, 24-2, ..., 24-i.

The upstream CDM signal is routed through WDM filter 28 to optical splitter/combiner 26 and input to optical splitter 84 as a CDM signal 23-2. In this example, the CDM signal 23-2 is branched into i identical CDM signals in the optical splitter 84 and input to the CDM receivers 24-1 to 24-i, which decode the CDM signals and output them as received signals 25-1 to 25-i. The CDM receivers 24-1 to 24-i are connected to a layer-two switch 154, through which the decoded received signals 25-1 to 25-i are transmitted to the edge router 156, and thus to the metropolitan network 158.

The CDM section 14 with the structure described above enables bidirectional communication of CDM digital data signals over i channels between the OLT 10 and the ONUs, with an additional common channel (channel j) for multicasting or broadcasting to the ONUs. On the common channel, a downstream digital video signal is supplied, for example, from the metropolitan network 158 through the edge router 156 and the layer-two switch 152 to the CDM transmitter 22-j and encoded in the CDM transmitter 22-j. The encoded digital video signal is routed through optical combiner 78, optical splitter/combiner 26, and WDM filter 28 to the passive optical network 30, and transmitted to the ONUs.

Although only one common-channel CDM transmitter 22-j is shown in FIG. 4, a plurality of common-channel CDM transmitters for transmitting digital video signals on multiple common code channels may be provided, as in the first embodiment.

The structure and operation of the ONUs in the second embodiment will now be described with reference to FIG. 5. The second embodiment includes i ONUs 44-1 to 44-i of the first type and at least one ONU 42 of the second type. The ONUs of the first type are also denoted ONU-1 to ONU-i in FIG. 5.

The PON communication system in the second embodiment may also include ONUs of the third type. If any ONUs of the third type are present, they replace an equivalent number of ONUs of the first type, and are structured in the same way as the ONUs of the first type except that they also have a G-PON system unit and carry out both CDM and TDM communication with the OLT 10.

Each of the ONUs 44-1 to 44-i of the first type has a wavelength filter 70, an optical splitter/combiner 72, CDM transmitting section 74, a CDM receiving section 76, and a digital video display unit 82-j, but no TDM transmitting or receiving facilities.

The CDM transmitting section 74 generates and transmits a CDM signal 73. The CDM transmitting section in ONU 44-1 uses the same code as CDM receiver 24-1 in the OLT 10 in FIG. 4. The CDM signal 73 is transmitted through the optical splitter/combiner 72 and wavelength filter 70 to the OLT 10. The CDM signal 73 may be used to transmit any type of data, including but not limited to video data.

The CDM transmitting section in each other ONU of the first type uses the same code as the corresponding CDM receiver in the OLT 10 in FIG. 4. For example, the CDM transmitting section (not shown) in ONU 44-i uses the same code as CDM receiver 24-i in the OLT.

The CDM receiving section 76 in ONU 44-1 includes CDM receivers 76-1 and 76-j and an optical splitter 86-1. The optical splitter 86-1 supplies the downstream CDM signal to both CDM receivers 76-1 and 76-*j*. CDM receiver 76-1 decodes the downstream CDM signal by using the same code as CDM transmitter 22-1 in the OLT 10 in FIG. 4. CDM receiver 76-*j* decodes the downstream CDM signal by using the same code as CDM transmitter 22-*j* in the OLT.

CDM receiver 76-*j* receives a CDM digital video signal transmitted from the CDM transmitter 22-*j* in the OLT 10. CDM receiver 76-*j* is connected to the digital video display unit 82-*j*. The digital video display unit 82 includes a set-top box connected to an IP television system and displays a video picture as described in the first embodiment.

CDM receiver 76-1 may be used to in conjunction with the CDM transmitting section 74 for a variety of purposes, including telephony, Internet access, and so on. The CDM receiver 76-1 and CDM transmitting section 74 are connected to appropriate equipment (not shown) for generating an upstream signal and storing, reproducing, or processing a downstream signal.

The ONU 42 of the second type has the same structure as an ONU in a conventional G-PON system and operates in the same way. The exemplary ONU 42 in FIG. 5 uses the PON system for transmitting voice signals, and is connected to a VoIP input-output unit 80. Other ONUs of the second type (not shown) may use the PON system for voice communication or other purposes, such as Internet access.

Figure 5:
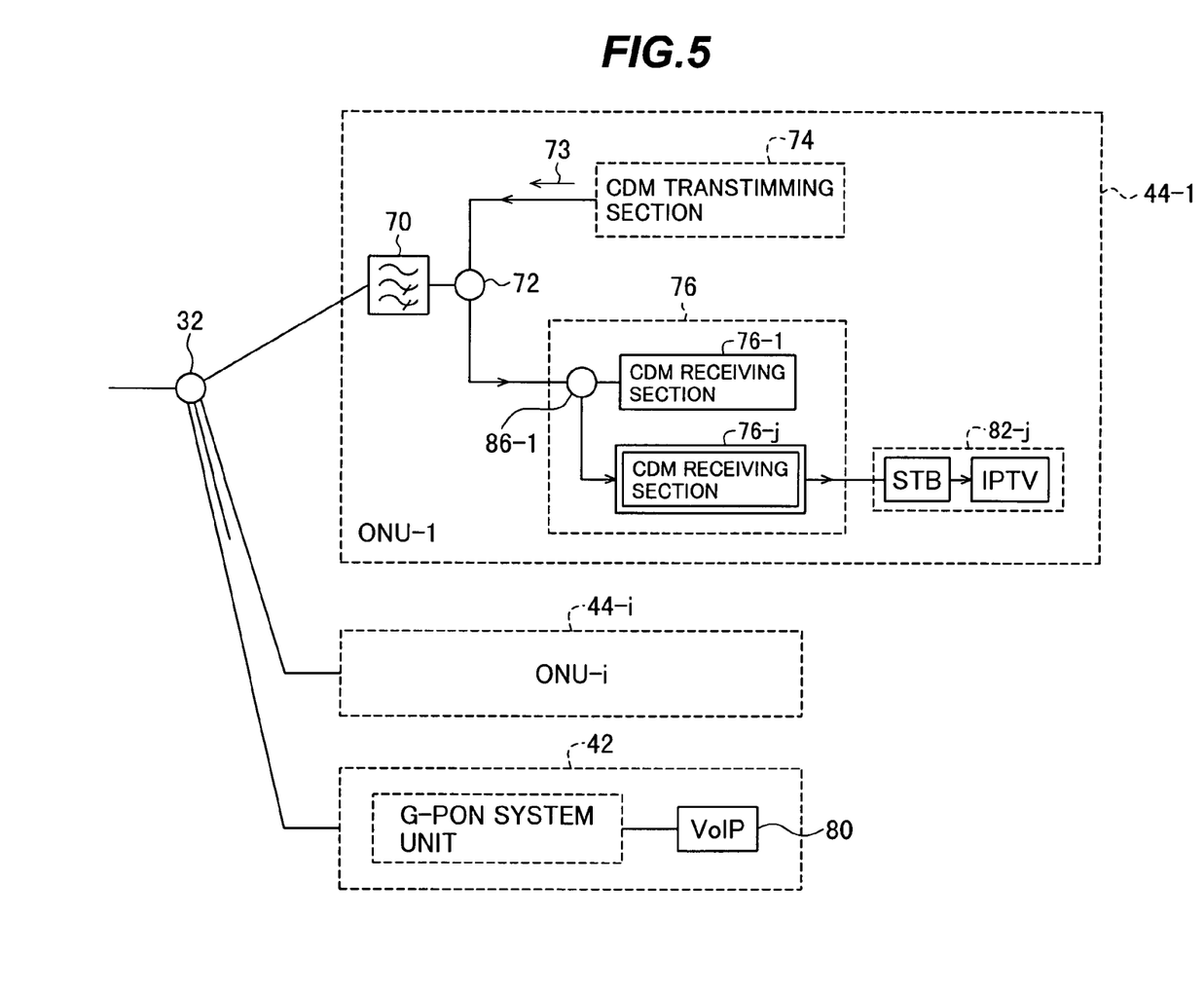
FIG. 5 is a block diagram showing the configurations of a first type and a second type of subscriber's unit in the PON communication system in the second embodiment.

Although the ONU 44-1 of the first type shown in FIG. 5 is equipped to receive only one common video channel, if the OLT in FIG. 4 is modified to transmit more than one common video channel, each ONU of the first type may be provided with additional CDM receivers to receive the additional common video channels. Alternatively, the code used by the decoder in the common-channel receiver 76-*j* may be programmable, enabling different common channels to be selected by changing the code.

The second embodiment provides a way to enhance an existing passive optical network by adding a CDM section 14 to the OLT and by adding ONUs of the first type, equipped for CDM communication instead of TDM communication. The added ONUs enjoy the benefits of CDM communication, including more robust communication and longer transmission distances, so the second embodiment can also be used to extend the reach of the passive optical network.

Third Embodiment

The third embodiment includes an OLT, multiple ONUs of the first type and at least one ONU of the second type.

The PON communication system in the third embodiment includes M ONUs of the first type, referred to below as ONU-1 to ONU-M, where M is an integer greater than one. Each of these ONUs communicates with the OLT 10 on k bidirectional CDM signal channels, where k is another integer greater than one. This arrangement greatly enhances the bidirectional communication capability of the system. The system also include ONUs of the second type, descriptions of which will be omitted.

In order to accommodate the increased number of bidirectional channels and improve the transmission efficiency of the system, a time-division scheme is used to multiplex the CDM signals transmitted and received by different ONUs in the third embodiment. Different ONUs communicate in different time slots. This arrangement permits different ONUs to use the same codes.

Figure 6:
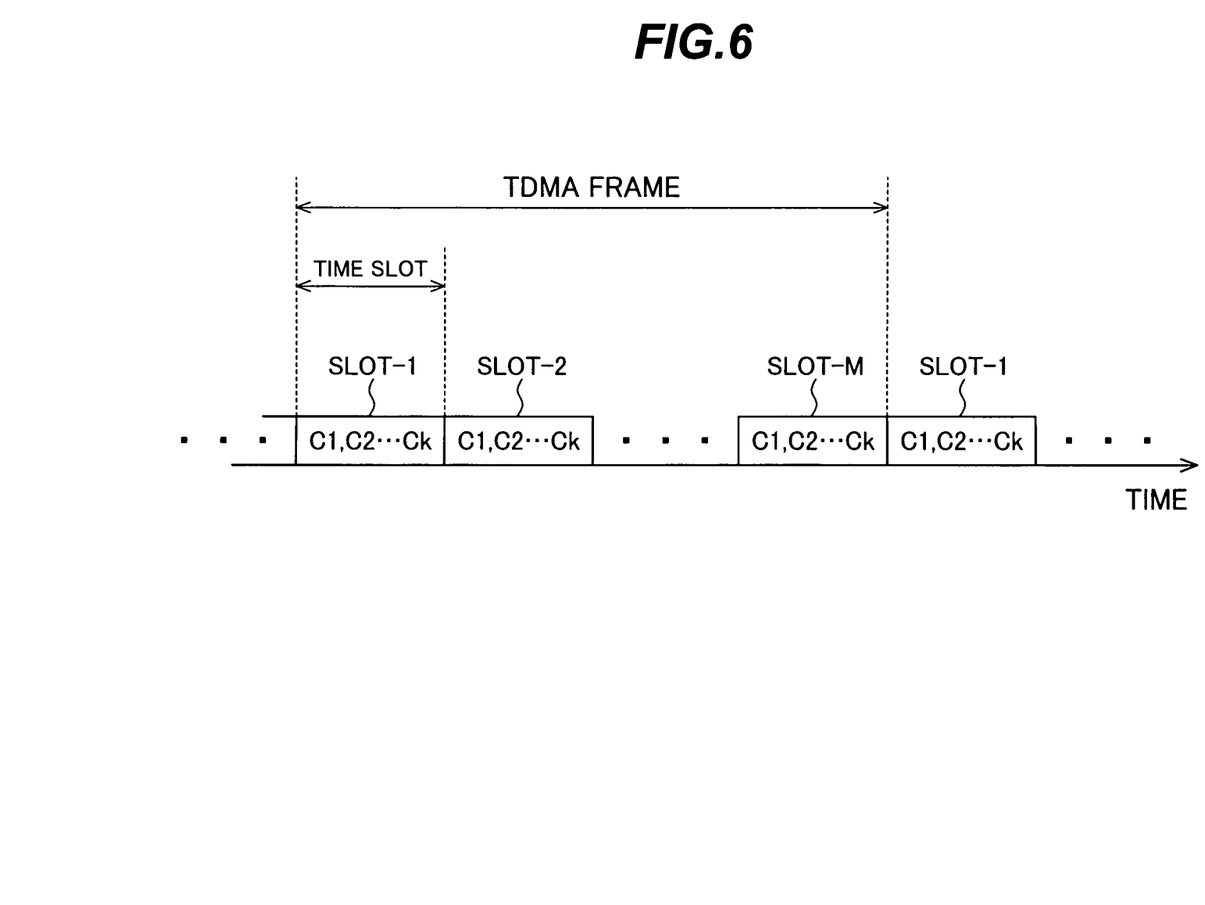
FIG. 6 illustrates CDM transmission in a PON communication system in a third embodiment.

FIG. 6 illustrates the multiplexing scheme used by the ONUs of the first type. FIG. 6 applies to both upstream and downstream CDM signals. The horizontal axis indicates time on an arbitrary scale. Transmission is organized into time-division multiple access (TDMA) frames, each of which is divided into M time slots, designated slot-1 to slot-M, which are sequentially allocated to ONU-1 to ONU-M. After the time slot allocated to ONU-M, the next time slot is allocated to ONU-1 and the same cycle repeats.

In a time slot (slot-1) allocated to ONU-1, the OLT 10 transmits a downstream CDM signal including k channels in which digital data are encoded with different codes. ONU-1 receives and decodes the part of the downstream CDM signal occupying this time slot, and transmits an upstream CDM signal with k code channels in the same time slot. In the next time slot (slot-2), the OLT 10 transmits another downstream CDM signal with k code channels, ONU-2 receives and decodes this downstream CDM signal, and ONU-2 transmits an upstream CDM signal including k code channels.

Figure 7:
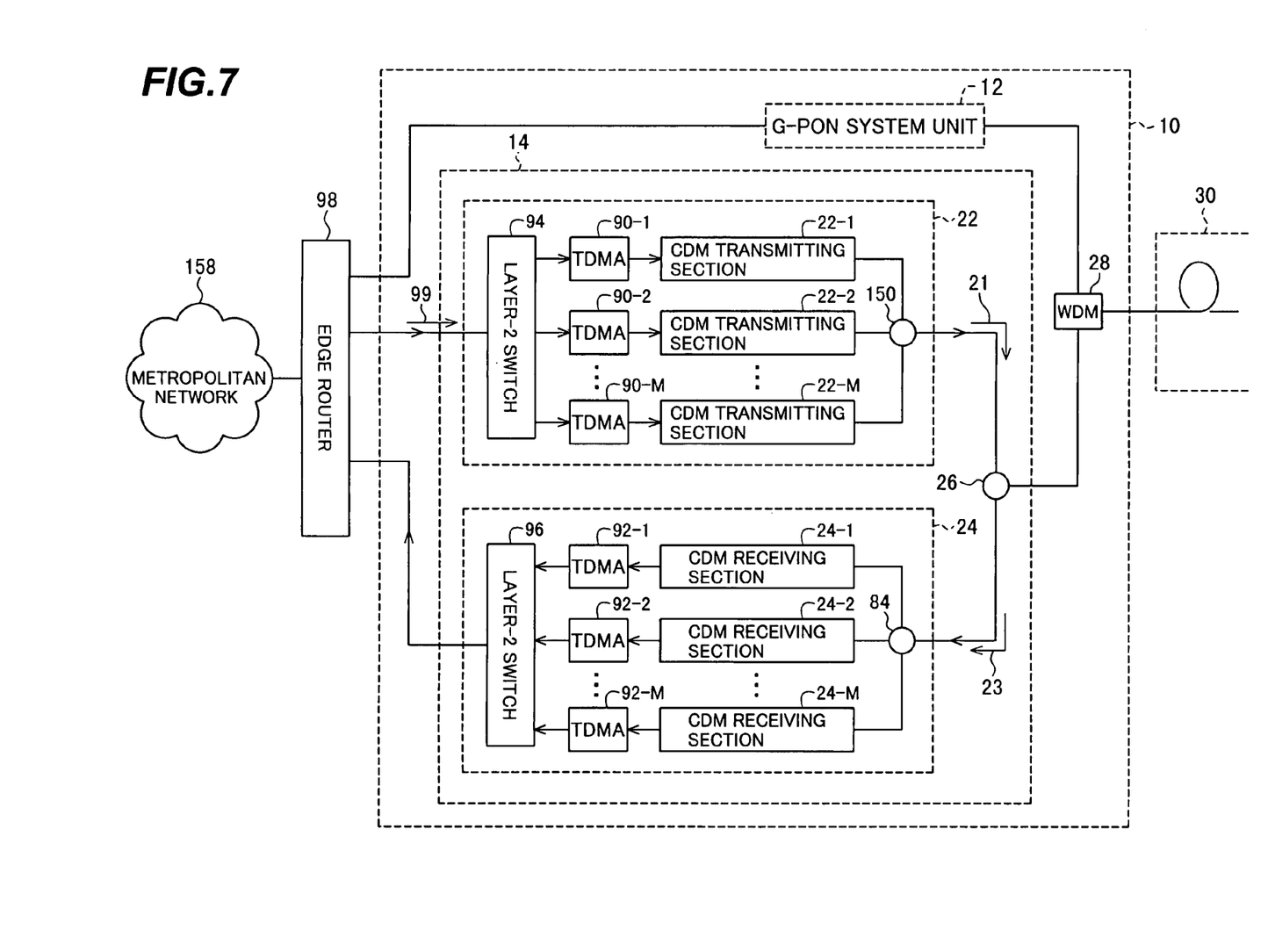
FIG. 7 is a block diagram showing the configuration of the line termination unit in the PON communication system in the third embodiment.

Referring to FIG. 7, the OLT 10 includes a TDM section 12, a CDM section 14, and a WDM filter 28. The TDM section 12 is used for communication with ONUs of the second type, and its structure and operation are the same as in the first and second embodiments. The WDM filter 28 is also the same as in the first and second embodiments. Repeated descriptions will be omitted.

The CDM section 14 has a CDM transmitting section 22, a CDM receiving section 24, and an optical splitter/combiner 26. As in the first and second embodiments, the optical splitter/combiner 26 routes a downstream CDM signal 21 from the CDM transmitting section 22 to the WDM filter 28, and routes an upstream CDM signal 23 from the WDM filter 28 to the CDM receiving section 24. WDM filter 28 separates the upstream CDM signal from the TDM signals, which have different wavelengths, and combines the downstream CDM signal with the downstream TDM signal.

The CDM transmitting section 22 includes CDM transmitters 22-1 to 22-M corresponding to ONU-1 to ONU-M, time division multiple access (TDMA) units 90-1 to 90-M, a layer-two switch 94, and an optical combiner 150. The TDMA units 90-1 to 90-M are inserted between the layer-two switch 94 and the CDM transmitters 22-1 to 22-M to add necessary delays to the signals supplied to the CDM transmitters 22-1 to 22-M.

The layer-two switch 94 receives a downstream signal 99 transmitted from a metropolitan network 158 through an edge router 98, extracts the signal content to be transmitted to each of the M ONUs of the first type (ONU-1 to ONU-M), and provides this signal content to the corresponding TDMA units 90-1 to 90-M. The signal destined to each ONU of the first type includes k channels of digital video, digital audio, or other digital data.

Each of the TDMA units 90-1 to 90-M adds an appropriate delay to each channel in the downstream signal it receives from the layer-two switch 94 to align all k channels with the time slot allocated to the destination ONU.

Each of the CDM transmitters 22-1 to 22-M includes k encoders (not shown) for encoding the k channels in the received downstream signal with different codes, and an optical combiner (not shown) for combining the k encoded channel signals into a CDM signal. The CDM signals output from the CDM transmitters 22-1 to 22-M are then multiplexed on the time axis by optical combiner 150 and output as a downstream CDM signal 21, in which the signals from different CDM transmitters 22-1 to 22-M occupy different time slots. The downstream CDM signal 21 is routed through the optical splitter/combiner 26 to the WDM filter 28 and transmitted to the ONUs.

The CDM receiving section 24 includes CDM receivers 24-1 to 24-M that receive identical copies of the upstream CDM signal 23 from optical splitter 84. The CDM receivers 24-1 to 24-M are connected to respective TDMA units 92-1 to 92-M. The TDMA units 92-1 to 92-M are connected to a layer-two switch 96, which is connected to the edge router 98.

As shown in FIG. 6, each frame of the upstream CDM signal 23 includes M time slots, with k code channels in each time slot. The M time slots are assigned to the CDM receivers 24-1 to 24-M in the same cyclic order as they are assigned to the ONUs of the first type ONU-1 to ONU-M. Each of the CDM receivers 24-1 to 24-M includes k decoders (not shown) that decode the k signal channels in the assigned time slot. The resulting k decoded signals are output in parallel to the TDMA unit connected to the CDM receiver.

The TDMA units 92-1 to 92-M add appropriate delays to the decoded CDM signals received from the CDM receivers 24-1 to 24-M so that the k channel signals output by each CDM receiver arrive at the layer-two switch 96 with the necessary timing.

The layer-two switch 96 receives M upstream signals with timing adjusted by the TDMA units 92-1 to 92-M, and sends them through the edge router 98 to the metropolitan network 158.

Next the structure and operation of the ONUs of the first type, shown as ONUs 44-1 to 44-M in FIG. 8, will be described. ONUs 44-1 to 44-M in FIG. 8 were referred to as ONU-1 to ONU-M in the discussion above. ONU 44-1 to ONU 44-M all have the same structure, so ONU 44-1 will be described as an example.

ONU 44-1 includes a wavelength filter 70, an optical splitter/combiner 72, a CDM transmitting section 74, and a CDM receiving section 76.

The CDM transmitting section 74 includes k CDM transmitters 74-1 to 74-k and an optical combiner 88. CDM signals output from the CDM transmitters 74-1 to 74-M are combined in optical combiner 88 and output as a CDM signal 73. The CDM signal 73 is routed through optical splitter/combiner 72 to the wavelength filter 70, and transmitted through the passive optical coupler 32 to the OLT 10.

The CDM transmitters 74-1 to 74-k are assigned respective codes C1 to Ck, which are the codes that were indicated in FIG. 6. The same k codes may be used in each of ONUs 44-1 to 44-M.

The CDM receiving section 76 includes k CDM receivers 76-1 to 76-k and an optical splitter 90. The downstream signal transmitted from the OLT 10 through the passive optical coupler 32 to the ONUs is input to the wavelength filter 70, which isolates the CDM component of the signal, and further routed through the optical splitter/combiner 72 to the optical splitter 90 in the CDM receiving section 76 as CDM signal 75.

The optical splitter 90 splits CDM signal 75 into k identical copies for input to the CDM receivers 76-1 to 76-k.

The CDM receivers 76-1 to 76-k use codes C1 to Ck, respectively, to decode CDM signal 75, thereby obtaining k different decoded signals, which are output to respective devices such as telephone sets, personal computers, or set-top boxes (not shown).

By providing k bidirectional channels for each ONU of the first type, the third embodiment can accommodate subscribers with multiple simultaneous communication needs, which may include video needs as well as telephony and computer networking.

Figure 8:
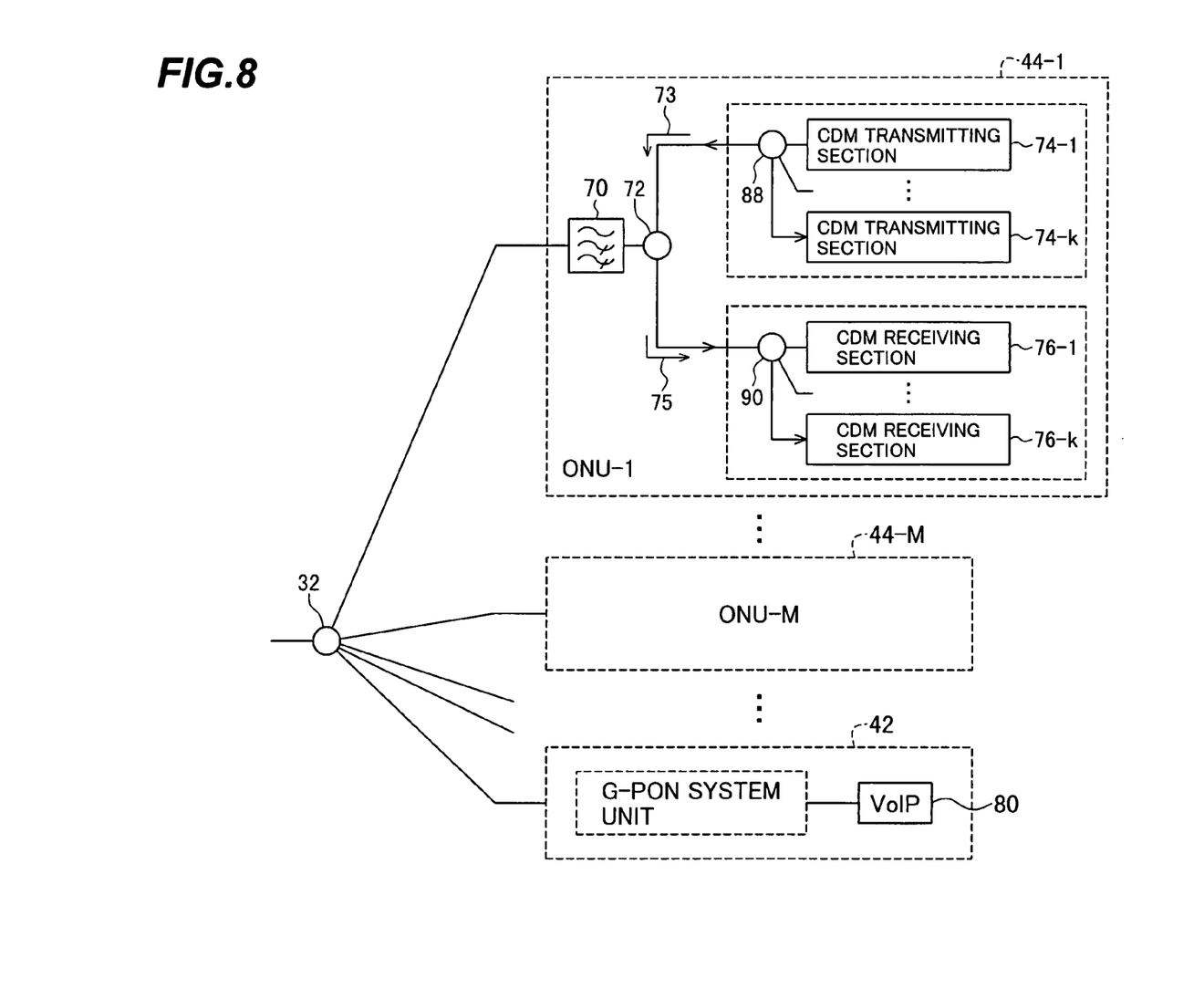
FIG. 8 is a block diagram showing a configuration including a plurality of subscribers' units of the first type in the PON communication system in the third embodiment.

The ONUs 42 of the second type, only one of which is shown in FIG. 8 have the same internal structure as in the second embodiment, including a G-PON system unit connected to a VoIP input-output unit 80.

In a variation of the third embodiment, a single time slot is shared by two or more ONUs of the first type. For example, k ONUs of the first type may share a time slot, each ONU using a different code to transmit and receive one signal channel in the time slot. In this variation, the maximum number of the ONUs of the first type that can be accommodated is the product (M×k) of the number of time slots M and the number of code channels k per time slot.

In another variation of the third embodiment, one or more of the time slots are shared by all of the ONUs of the first type. These common time slots can be used for video multicasting or broadcasting.

The PON communication system in the third embodiment may also include ONUs of the third type, each having both CDM and conventional TDM capabilities.

It is not necessary for the upstream CDM time slots to be synchronized with the downstream CDM time slots as described above.

While the first to third embodiments have been described entirely in terms of optical signals, some of the signal processing in the OLTs and ONUs may be done electronically by providing suitable opto-electric and electro-optic conversion devices such as photodiodes and laser diodes. The specific processing to be done electrically is a design choice.

Those skilled in the art will recognize that further variations are possible within the scope of the invention, which is defined in the appended claims.

What is claimed is:

1. A passive optical network (PON) communication system, comprising:
   a line termination unit; and
   a plurality of subscriber units provided with access to the line termination unit through a passive optical coupler,
   the line termination unit including:
      a first section for generating a downstream code division multiplex (CDM) signal including a plurality of downstream code channels, transmitting the downstream CDM signal to the subscriber units, and receiving an upstream CDM signal including a plurality of upstream code channels from the subscriber units, the upstream and downstream CDM signals occupying a first wavelength band;
      a second section for generating a downstream time division multiplex (TDM) signal including a plurality of downstream time slots, transmitting the downstream TDM signal to the subscriber units in a second wavelength band separate from the first wavelength band, and receiving an upstream TDM signal including a plurality of upstream time slots from the subscriber units in a third wavelength band separate from the first and second wavelength bands, the second section including a wavelength separation filter for separating the second wavelength band from the third wavelength band; and
      a wavelength multiplexing filter for combining the downstream CDM signal with the downstream TDM signal, and for separating the upstream CDM signal from the upstream TDM signal by separating the first wavelength band from the second and third wavelength bands, wherein
      the downstream CDM signal occupies a plurality of downstream CDM time slots such that different parts of the downstream CDM signal occupying different ones of the downstream CDM time slots are receivable and decodable by different ones of the subscriber units, each downstream CDM time slot including at least two of the downstream code channels, and the different parts of the downstream CDM signal that are receivable and decodable by the different ones of the subscriber units occupy different ones of the downstream CDM time slots, and the upstream CDM signal occupies a plurality of upstream CDM time slots such that the different ones of the subscriber units transmit different parts of the upstream CDM signal occupying different ones of the upstream CDM time slots, each upstream CDM time slot including at least two of the upstream code channels.

2. The passive optical network communication system of claim 1, wherein the downstream CDM signal includes at least one video channel.

3. The passive optical network communication system of claim 1, wherein each one of the downstream code channels is receivable by the plurality of the subscriber units.

4. The passive optical network communication system of claim 3, wherein the downstream code channels are video channels.

5. The passive optical network communication system of claim 1, wherein the downstream code channels include:
a plurality of individual code channels, each one of the individual code channels being receivable by a different one of the subscriber units; and
a common code channel receivable by a plurality of the subscriber units.

6. The passive optical network communication system of claim 5, wherein the common code channel is a video code channel.

7. The passive optical network communication system of claim 1, wherein each one of the downstream CDM time slots is receivable by a different one of the subscriber units.

8. The passive optical network communication system of claim 1, wherein at least one of the downstream CDM time slots is receivable by at least two of the subscriber units, the at least two of the subscriber units receiving different ones of the downstream code channels.

9. The passive optical network communication system of claim 1, wherein at least one of the subscriber units comprises:
a wavelength filter for passing the first wavelength band and rejecting the second and third wavelength bands;
a CDM transmitting section connected to the wavelength filter, for transmitting at least one code channel in the upstream CDM signal; and
a CDM receiving section connected to the wavelength filter, for receiving at least one code channel in the downstream CDM signal.

10. The passive optical network communication system of claim 9, wherein said at least one of the subscriber units uses one of the downstream code channels for receiving video and uses another one of the downstream code channels for receiving non-video data.

11. The passive optical network communication system of claim 9, wherein said at least one of the subscriber units uses at least two of the downstream code channels and at least two of the upstream code channels as at least two bidirectional communication channels.

12. The passive optical network communication system of claim 1, wherein at least one of the subscriber units comprises:
a wavelength separation filter for rejecting the first wavelength band and separating the second wavelength band from the third wavelength band;
a TDM transmitting section connected to the wavelength separation filter, for transmitting an upstream signal in one of the upstream TDM time slots; and
a TDM receiving section connected to the wavelength separation filter, for receiving a downstream signal in one of the downstream TDM time slots.

13. The passive optical network communication system of claim 1, wherein at least one of the subscriber units comprises:
a wavelength filter for passing the first wavelength band and rejecting the second and third wavelength bands;
a CDM transmitting section connected to the wavelength filter, for transmitting at least one code channel in the upstream CDM signal; and
a CDM receiving section connected to the wavelength filter, for receiving at least one code channel in the downstream CDM signal;
a wavelength separation filter for rejecting the first wavelength band and separating the second wavelength band from the third wavelength band;
a TDM transmitting section connected to the wavelength separation filter, for transmitting an upstream signal in one of the upstream TDM time slots; and
a TDM receiving section connected to the wavelength separation filter, for receiving a downstream signal in one of the downstream TDM time slots.

14. The passive optical network communication system of claim 13, wherein said at least one of the subscriber units uses the upstream and downstream TDM signals for telephony and uses the downstream CDM signal for receiving video.

15. The passive optical network communication system of claim 1, wherein:
the first wavelength band includes wavelengths from 1520 nanometers to 1540 nanometers;
the second wavelength band includes wavelengths from 1480 nanometers to 1500 nanometers; and
the third wavelength band includes wavelengths from 1250 nanometers to 1350 nanometers.

16. The passive optical network communication system of claim 1, wherein:
the first wavelength band includes wavelengths higher than 1570 nanometers;
the second wavelength band includes wavelengths from 1480 nanometers to 1500 nanometers; and
the third wavelength band includes wavelengths from 1250 nanometers to 1350 nanometers.

17. The passive optical network communication system of claim 1, wherein transmission of the downstream CDM signal and the upstream CDM signal is organized into time-division multiple access (TDMA) frames, each of which is divided into a first number of time slots.

18. The passive optical network communication system of claim 17, wherein the first number of time slots of each TDMA frame are allocated to a same sequence of the first number of different ones of the subscriber units.

19. A passive optical network (PON) communication system, comprising:
a line termination unit; and
a plurality of subscriber units provided with access to the line termination unit through a passive optical coupler,
the line termination unit including:
a first section for generating a downstream code division multiplex (CDM) signal including a plurality of downstream code channels, transmitting the downstream CDM signal to the subscriber units, and receiving an upstream CDM signal including a plurality of upstream code channels from the subscriber units, the upstream and downstream CDM signals occupying a first wavelength band;

a second section for generating a downstream time division multiplex (TDM) signal including a plurality of downstream time slots, transmitting the downstream TDM signal to the subscriber units in a second wavelength band separate from the first wavelength band, and receiving an upstream TDM signal including a plurality of upstream time slots from the subscriber units in a third wavelength band separate from the first and second wavelength bands, the second section including a wavelength separation filter for separating the second wavelength band from the third wavelength band; and a wavelength multiplexing filter for combining the downstream CDM signal with the downstream TDM signal, and for separating the upstream CDM signal from the upstream TDM signal by separating the first wavelength band from the second and third wavelength bands, wherein the downstream CDM signal occupies a plurality of downstream CDM time slots such that different parts of the downstream CDM signal occupying different ones of the downstream CDM time slots are receivable and decodable by different ones of the subscriber units, each downstream CDM time slot including at least two of the downstream code channels, and the upstream CDM signal occupies a plurality of upstream CDM time slots such that the different ones of the subscriber units transmit different parts of the upstream CDM signal occupying different ones of the upstream CDM time slots, each upstream CDM time slot including at least two of the upstream code channels, wherein transmission of the downstream CDM signal and the upstream CDM signal is organized into time-division multiple access (TDMA) frames, each of which is divided into a first number of time slots, wherein the first number of time slots of each TDMA frame are allocated to a same sequence of the first number of different ones of the subscriber units, and wherein each of the first number of different subscriber units, to which a respective one of the first number of time slots is allocated, is configured to receive and decode a respective part of the downstream CDM signal that occupies the respective time slot and includes a second number of code channels, and to transmit, in the respective time slot, a respective part of the upstream CDM signal with the second number of code channels.

* * * * *